(12) United States Patent
McDaniel

(10) Patent No.: US 12,323,223 B2
(45) Date of Patent: *Jun. 3, 2025

(54) SYSTEM AND METHOD FOR CONFIGURING A COMMUNICATIONS DEVICE FOR SPACE-TERRESTRIAL COMMUNICATIONS

(71) Applicant: ATLAS Space Operations, Inc., Traverse City, MI (US)

(72) Inventor: Sean McDaniel, Traverse City, MI (US)

(73) Assignee: ATLAS Space Operations, Inc., Traverse City, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/435,490

(22) Filed: Feb. 7, 2024

(65) Prior Publication Data

US 2024/0348325 A1    Oct. 17, 2024

Related U.S. Application Data

(63) Continuation of application No. 17/578,046, filed on Jan. 18, 2022, now Pat. No. 11,929,819, which is a
(Continued)

(51) Int. Cl.
*H04W 56/00* (2009.01)
*H04B 7/185* (2006.01)
*H04B 17/40* (2015.01)

(52) U.S. Cl.
CPC ..... *H04B 7/18513* (2013.01); *H04B 7/18515* (2013.01); *H04B 7/18526* (2013.01);
(Continued)

(58) Field of Classification Search
CPC .............. H04B 7/18513; H04B 17/40; H04B 7/18515; H04B 7/18526; H04B 7/18582; H04B 7/18584
(Continued)

(56) References Cited

U.S. PATENT DOCUMENTS

| 5,918,157 A | 6/1999 | Wiedeman et al. |
| 6,690,934 B1 | 2/2004 | Conrad, Jr. et al. |

(Continued)

FOREIGN PATENT DOCUMENTS

| CN | 102027695 A | 4/2011 |
| CN | 103648132 A | 3/2014 |

(Continued)

OTHER PUBLICATIONS

Bode, Corrected Notice of Allowability dated Sep. 22, 2020, directed to U.S. Appl. No. 16/290,734; 3 pages.

(Continued)

*Primary Examiner* — Sai Ming Chan
(74) *Attorney, Agent, or Firm* — Morrison & Foerster LLP

(57) ABSTRACT

The present teachings is generally directed to facilitating satellite and terrestrial internet communications. In some embodiments, configuration information for configuring a communications device may be retrieved. The configuration information may be provided to the communications device, and the communications device may be caused to be configured based on the configuration information. Responsive to receiving a first data signal from a first satellite, the communications device may be configured to generate and output a second data signal based on the first data signal, the first data signal including first data encoded using one or more space-based communication protocols, and the second data including second data encoded using one or more terrestrial-based communication protocols.

20 Claims, 6 Drawing Sheets

Related U.S. Application Data continuation of application No. 16/663,990, filed on Oct. 25, 2019, now Pat. No. 11,228,361.

(52) U.S. Cl.
CPC ..... *H04B 7/18582* (2013.01); *H04B 7/18584* (2013.01); *H04B 17/40* (2015.01)

(58) Field of Classification Search
USPC ......................................................... 370/316
See application file for complete search history.

(56) References Cited

U.S. PATENT DOCUMENTS

| | | | |
|---|---|---|---|
| 8,639,182 B2 | 1/2014 | Moore, III | |
| 9,059,784 B2 | 6/2015 | Enge et al. | |
| 10,225,000 B1 | 3/2019 | Chowdhury et al. | |
| 10,659,148 B2 | 5/2020 | Trutna et al. | |
| 11,463,158 B2 | 10/2022 | Devaraj | |
| 11,488,046 B2 | 11/2022 | McCormick | |
| 2003/0081582 A1* | 5/2003 | Jain | H04W 8/265 370/352 |
| 2003/0224796 A1 | 12/2003 | Landes | |
| 2004/0111465 A1* | 6/2004 | Chuang | H04L 9/40 709/219 |
| 2005/0037706 A1 | 2/2005 | Settle | |
| 2006/0135058 A1* | 6/2006 | Karabinis | H04W 4/06 455/12.1 |
| 2012/0131650 A1 | 5/2012 | Gutt et al. | |
| 2013/0329630 A1 | 12/2013 | Becker | |
| 2015/0215670 A1* | 7/2015 | Patel | H04N 21/6143 725/116 |
| 2016/0037434 A1 | 2/2016 | Gopal et al. | |
| 2018/0034536 A1 | 2/2018 | Trutna | |
| 2018/0083741 A1 | 3/2018 | Motoyoshi | |
| 2018/0098247 A1 | 4/2018 | Gopal et al. | |
| 2018/0167136 A1 | 6/2018 | Eickhoff | |
| 2018/0183855 A1 | 6/2018 | Sabella et al. | |
| 2018/0198516 A1* | 7/2018 | Garcia | G08G 5/0082 |
| 2018/0227272 A1 | 8/2018 | Zaruba et al. | |
| 2018/0278323 A1 | 9/2018 | Trutna | |
| 2018/0309507 A1 | 10/2018 | Vaughan | |
| 2018/0372882 A1 | 12/2018 | Lee | |
| 2019/0121665 A1 | 4/2019 | Clancy | |
| 2019/0253133 A1 | 8/2019 | Choquette | |
| 2019/0313357 A1 | 10/2019 | Wang et al. | |
| 2019/0377989 A1 | 12/2019 | Dizengof et al. | |
| 2020/0007224 A1 | 1/2020 | Hawthorne et al. | |
| 2020/0007414 A1 | 1/2020 | Smith et al. | |
| 2020/0280366 A1 | 9/2020 | Bode | |
| 2020/0380056 A1 | 12/2020 | Morris et al. | |
| 2021/0044348 A1 | 2/2021 | Bode | |
| 2021/0044350 A1* | 2/2021 | Karim | H04B 7/18563 |
| 2021/0247519 A1 | 8/2021 | Reid | |
| 2021/0263164 A1 | 8/2021 | Gunning | |
| 2022/0038172 A1 | 2/2022 | Kargieman | |
| 2022/0329485 A1 | 10/2022 | McCormick | |
| 2022/0360323 A1 | 11/2022 | Dooling | |
| 2022/0360518 A1 | 11/2022 | McCormick et al. | |
| 2022/0376777 A1 | 11/2022 | Bode et al. | |
| 2023/0130388 A1 | 4/2023 | Reid | |
| 2023/0412260 A1 | 12/2023 | Bode et al. | |
| 2024/0056556 A1 | 2/2024 | Aoki | |
| 2024/0129027 A1 | 4/2024 | Bode | |

FOREIGN PATENT DOCUMENTS

| | | |
|---|---|---|
| CN | 105281958 A | 1/2016 |
| EP | 1031242 B1 | 8/2000 |
| EP | 2779481 A1 | 9/2014 |
| JP | 2001-285170 A | 10/2001 |
| JP | 2001-522177 A | 11/2001 |
| JP | 2002-27009 A | 1/2002 |
| JP | 2018-530200 A | 10/2018 |
| KR | 10-2013-0129363 A | 11/2013 |
| KR | 10-2019-0116385 A | 10/2019 |
| WO | 99/22529 A1 | 5/1999 |
| WO | 00/67449 A1 | 11/2000 |
| WO | 2020/006160 A1 | 1/2020 |

OTHER PUBLICATIONS

Bode, U.S. Office Action dated Apr. 3, 2020, directed to U.S. Appl. No. 16/290,734; 8 pages.

Decision to Grant a Patent dated Jun. 30, 2023, directed to JP Application No. 2021-552242; 5 pages.

Extended European Search Report dated Oct. 17, 2022, directed to EP Application No. 20766418.6; 11 pages.

First Office Action dated Feb. 4, 2024, directed to CN Application No. 202080032184.3; 16 pages.

Hu, P. (Dec. 2021). "Closing the Management Gap for Satellite-Integrated Community Networks: A Hierarchical Approach to Self-Maintenance," IEEE Communications Magazine 59(12):43-49.

International Search Report and Written Opinion mailed Apr. 15, 2024, directed to International Application No. PCT/US2023/071457; 18 pages.

International Search Report and Written Opinion mailed Feb. 18, 2021, directed to International Application No. PCT/US2020/057381; 9 pages.

International Search Report and Written Opinion mailed Jun. 5, 2020, directed to International Application No. PCT/US2020/016988; 13 pages.

Kodheli et al. (Oct. 2020). "Satellite Communications in the New Space Era: A Survey and Future Challenges," IEEE Communications Surveys & Tutorials, 23(1):70-109.

McDaniel, U.S. Office Action mailed Aug. 2, 2023, directed to U.S. Appl. No. 17/578,046; 7 pages.

McDaniel, U.S. Office Action mailed Feb. 15, 2023, directed to U.S. Appl. No. 17/578,046; 26 pages.

McDaniel, U.S. Office Action mailed Mar. 18, 2021, directed to U.S. Appl. No. 16/663,990; 25 pages.

Notice of Reasons for Refusal dated Dec. 20, 2022, directed to JP Application No. 2021-552242; 10 pages.

Office Action dated Apr. 8, 2022, directed to IN Application No. 202147044702; 6 pages.

Office Action dated Dec. 26, 2022, directed to SG Application No. 11202109558U; 8 pages.

Vazquez et al. (Mar. 2021). "Machine Learning for Satellite Communications Operations," IEEE Communications Magazine 59(2):22-27.

\* cited by examiner

SYSTEM AND METHOD FOR CONFIGURING A COMMUNICATIONS DEVICE FOR SPACE-TERRESTRIAL COMMUNICATIONS

CROSS-REFERENCE TO RELATED APPLICATIONS

This application is a continuation of U.S. application Ser. No. 17/578,046, filed Jan. 18, 2022, which is a continuation of U.S. application Ser. No. 16/663,990, filed on Oct. 25, 2019, now U.S. Pat. No. 11,228,361, the entire contents of each of which is incorporated herein in by reference.

BACKGROUND

The present teaching generally relates to configuring a communications device. More specifically, the present teaching relates to a system and method for configuring a communications device to receive a data signal from a satellite and output a data signal converted for terrestrial communications networks.

In recent years, the number of satellites being sent into low earth orbit (LEO) has increased exponentially. In particular, many companies are provisioning new LEO satellites for generating and expanding space-based communications networks. Space-based communications networks differ from terrestrial-based communications networks. For example, while terrestrial-based communications networks have a standardized set of communication protocols, such as IPv4, each space-based communications network may have their own space-based communication protocols including a unique waveform, different frequency band or bands with which they operate, different modulation schemes, and different encoding techniques. Furthermore, to access a space-based communications network, a client device will need to access a satellite modem, which typically are located at satellite ground stations. The client device will also have to know how to decode data signals from the satellite and convert the data signals into the standardized set of communication protocols for terrestrial-based communications networks. The complexity of such a task increases when considering that different satellites are capable of communicating different ground stations at different times.

Thus, there is a need for methods, systems, and programming that facilitate configuration of communications devices, such as satellite modems, for overcoming the aforementioned drawbacks.

SUMMARY

The following is a non-exhaustive listing of some aspects of the present techniques. These and other aspects are described in the following disclosure.

Some aspects may describe a system for facilitating satellite and terrestrial internet communications, the system comprising: a computer system comprising one or more processors programed with computer program instructions that, when executed, cause the computer system to: receive a first request to configure a communications device associated with a satellite ground station, wherein the first request is received in response to a determination that, during a first time period, a first satellite associate with a first space-based communications network is capable of communicating with the satellite ground station, wherein the request is received prior to the first time period beginning; retrieve, from a configuration database, and in response to the first request, first configuration information to be used to configure the communications device such that the communications device is capable of: receiving a first data signal comprising first data encoded using one or more first space-based communication protocols associated with a first space-based communications network, and outputting, based on the first data signal, a second data signal comprising second data encoded using one or more terrestrial-based communication protocols associated with a terrestrial-based communications network; provide the first configuration information to the communications device; and cause the communications device to be configured based on the first configuration information such that, in response to the communications device receiving, as at least a portion of an input, the first data signal from the first satellite, the communications device outputs the second data signal to be provided to the terrestrial-based communications network.

Additional aspects may describe one or more non-transitory computer readable media comprising instructions that, when executed by one or more processors, effectuate operations comprising: retrieving first configuration information for configuring a communications device; providing the first configuration information to the communications device; and causing the communications device to be configured based on the first configuration information, wherein: responsive to receiving a first data signal from a first satellite, the communications device is configured to generate and output a second data signal based on the first data signal, the first data signal comprising first data encoded using one or more first space-based communication protocols, and the second data signal comprising second data encoded using one or more terrestrial-based communication protocols.

Another aspect may describe a method implemented by one or more processors executing one or more computer program instructions that, when executed, perform the method, the method comprising: retrieving first configuration information for configuring a communications device; providing the first configuration information to the communications device; and causing the communications device to be configured based on the first configuration information, wherein: responsive to receiving a first data signal from a first satellite, the communications device is configured to generate and output a second data signal based on the first data signal, the first data signal comprising first data encoded using one or more first space-based communication protocols, and the second data signal comprising second data encoded using one or more terrestrial-based communication protocols.

BRIEF DESCRIPTION OF THE DRAWINGS

The methods, systems, and programming described herein are further described in terms of exemplary embodiments. These exemplary embodiments are described in detail with reference to the drawings. These embodiments are non-limiting exemplary embodiments, in which like referenced numerals represent similar structures throughout several views of the drawings, and wherein.

DETAILED DESCRIPTION

Figure 1:
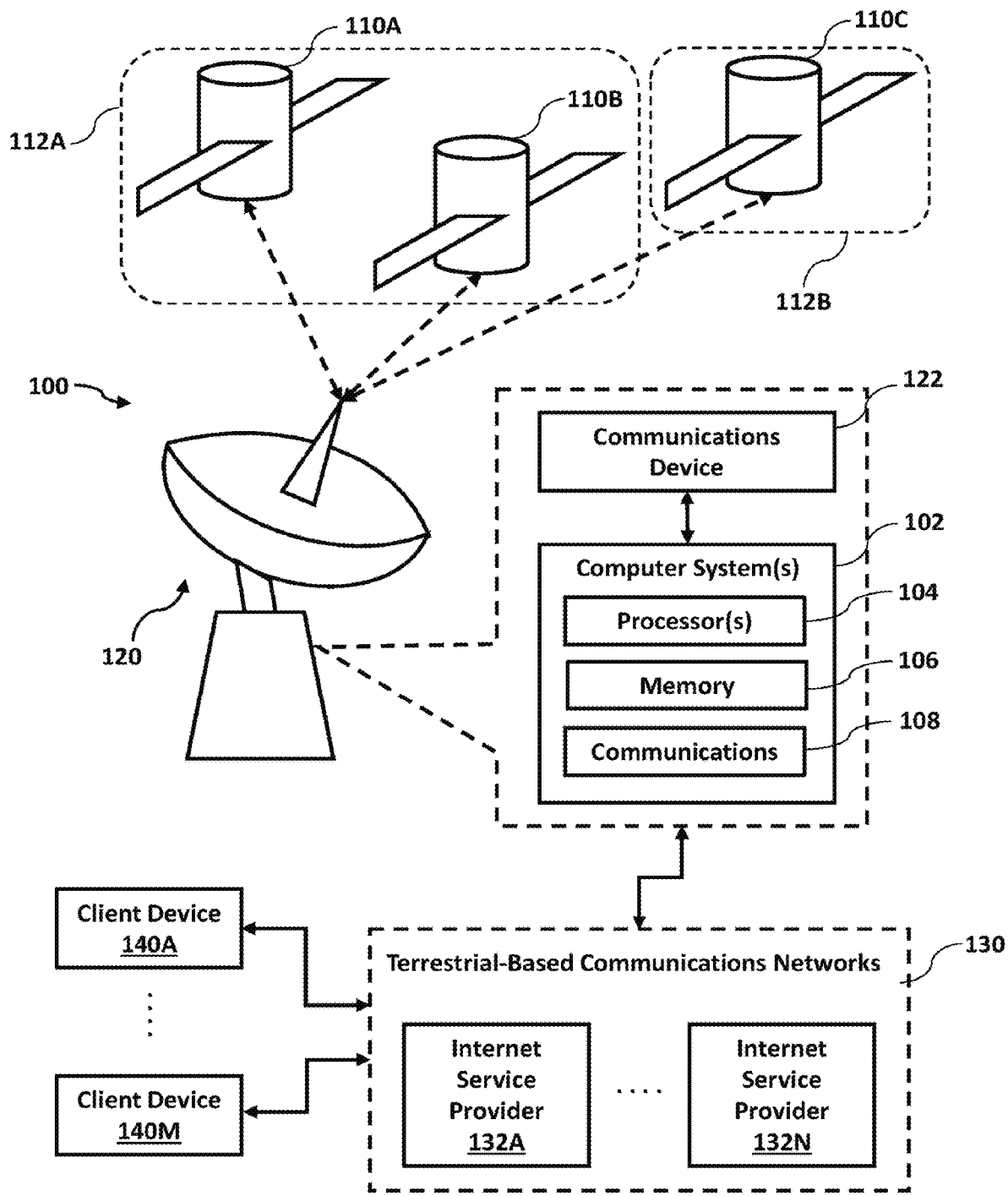
FIG. 1 is an illustrative diagram of an exemplary system for facilitating communications between space-based communications networks and terrestrial-based communications networks, in accordance with various embodiments.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

There are thousands of satellites orbiting the Earth currently. Data signals transmitted from/to satellites may be received by antennae located on Earth. Such antennae may be part of a satellite dish. A satellite dish may include an antenna and typically is a structure located at a "satellite ground station." A satellite ground station, as described herein, is a facility that includes one or more satellite dishes capable of communicating with one or more satellites in orbit. Satellite ground stations may also be referred to herein interchangeably as "ground stations" or "ground sites." Each satellite ground station may include hardware to control operations of the satellite ground station, the satellite dish, and communications into and out of the satellite ground station. One hardware component may be a communications device. For example, the communications device may be a satellite modem that receives data signals transmitted from a satellite to a satellite dish located at the satellite ground station. In some embodiments, the communications device may be integrated into or communicatively coupled with one or more computing devices or systems.

In some embodiments, the communications device (e.g., a satellite modem) may be configured to transform received data signals into a format communicable by a client device. This may include converting data signals from a satellite associated with a space-based communications network to data signals understandable by one or more terrestrial-based communications networks. For example, a communications device may transform an input data signal including data encoded using one or more space-based communication protocols into a data signal including data encoded using one or more terrestrial-based communication protocols (e.g., IPv4).

In order for a client device to obtain data from a satellite and/or provide instructions to a satellite, the client device may connect to a communications device at a satellite ground station whose satellite dish is able to communicate with the satellite. In some embodiments, a client device may be configured to connect to multiple communications devices each associated with a same or different satellite ground station in order to communicate with one or more satellites during each satellite's orbit. Furthermore, in some embodiments, a communications device may be configured to connect to and receive data signals from multiple satellites, each of which may be associated with a same or different space-based communications network.

As mentioned above, each satellite may be associated with a space-based communications network, and each space-based communications network may include a unique set of space-based communications protocols. In some embodiments, the satellites may be low earth orbit (LEO) satellites, which typically orbit at less than 2,000 kilometers above the Earth's surface. Each LEO satellite, which may be referred to herein interchangeably as a "satellite" or "celestial object," may operate in a particular frequency band or frequency bands. For example, a satellite may operate in the 12-18 GHz portion of the electromagnetic frequency spectrum, or in a set of discrete frequency ranges (e.g., 10.7-12.7 GHz, 14-14.5 GHz, 17.8-18.6 GHz, 18.8-19.3 GHz, 27.5-29.1 GHz, and 29.5-30 GHz frequency bands). Furthermore, each LEO satellite may have a unique waveform and demodulation scheme. A satellite's RF communications waveform may be defined by its modulation, such as phase shift keying (PSK), frequency shift keying (FSK), or Quadrature Amplitude Modulation. A satellite's frequency band(s), demodulation scheme, and waveform, for example, may be specified by the space-based communication protocols of the space-based communications network with which the satellite belongs. In some embodiments, a satellite may output data signals including radio frequency (RF) signals of one or more frequency ranges. The frequency ranges of the RF signals may correspond to the frequency bands that the satellite operates, such as the 12-18 GHz portion of the electromagnetic frequency spectrum, or in a set of discrete frequency ranges (e.g., 10.7-12.7 GHz, 14-14.5 GHz, 17.8-18.6 GHz, 18.8-19.3 GHz, 27.5-29.1 GHz, and 29.5-30 GHz frequency bands).

Furthermore, each satellite may transmit data signals including data encoded using the space-based communication protocols of the satellite's space-based communication network. The data signals may be transmitted from the satellite to one or more satellite ground stations. Each satellite ground station may include a satellite dish to receive the data signal, one or more communications devices (e.g., satellite modems), and one or more computer systems to configure the communications devices. A communications device may be configured based on the satellite transmitting data signals to the satellite ground station at a given time. Throughout the course of a day, different satellite ground stations may be capable of receiving data signals from different satellites based on the satellite ground stations geographical location, positioning, elevation, and/or atmospheric conditions. In some embodiments, a database of satellite positioning and orbital trajectories for various satellites may be computed in advance and stored so that a particular satellite ground station's computer system can determine when a particular satellite will be in that satellite ground station's satellite dish's line of sight. For example, during the time period of 12:00 AM to 1:00 AM EST, a first satellite may be capable of transmitting data signals to a satellite ground station's satellite dish, while a second satellite may be capable of transmitting data signals to the satellite ground station's satellite dish during the time period of 2:00 AM to 3:00 AM EST. As another example, during a same time period, two different satellites may be capable of transmitting their data signals to one satellite ground station.

The two satellites may be associated with a same space-based communications network, and thus may have the same space-based communication protocols, or the two satellites may be associated with different space-based communications networks.

In some embodiments, a client device that receives communications via a terrestrial-based communications network operating using one or more terrestrial-based communication protocols (e.g., IPv4) may seek to also access communications via a space-based communications network operating using one or more space-based communication protocols, and vice versa. However, because space-based communication protocols differ from terrestrial-based communication protocols, a conversion of data from one format to another (e.g., space-based to terrestrial-based, terrestrial-based to space-based) may be needed. For example, RF signals output by a satellite may be converted from analog to digital (A/D conversion), and may also be demodulated.

Techniques described herein allow for terrestrial-based communications networks to connect and exchange data with space-based communications networks. In some embodiments, such techniques may be performed by configuring a communications device (e.g., a satellite modem) to "translate" communications from satellites into a language understandable by client devices connected to terrestrial-based communications networks. By connecting space-based communication networks and terrestrial-based communications networks, the techniques described herein provide an additional layer of resiliency to terrestrial-based communications network that may be vulnerable to degradation and/or outages. For example, terrestrial-based communications networks may include infrastructure, such as satellite dishes and optical fiber systems, whose upkeep is dependent on environmental and economic factors associated with a country or principality where the infrastructure is located. If the environmental and/or economic factors impact upkeep of the infrastructure, terrestrial-based communications networks may be affected. Additionally, by connecting space-based communications networks and terrestrial-based communications networks, the reach of terrestrial-based communications networks may be expanded and improved, as well as having its capacity increased. For example, data signals from space-based communications networks may be aggregated and bonded to increase the throughput of a terrestrial-based communications network such that it includes the throughput of the data signals from the space-based communications networks.

FIG. 1 is an illustrative diagram of an exemplary system 100 for facilitating communications between space-based communications networks and terrestrial-based communications networks, in accordance with various embodiments. In some embodiments, system 100 may include a plurality of satellites 110A, 110B, and 110C. Each of satellites 110A-110C may be in low Earth orbit (e.g., less than 2,000 km above the Earth's surface), however some may be at greater distances (e.g., greater than 2,000 km). Depending on the particular distance from the Earth's surface, each of satellites 110A-C may have a different periodicity with which a complete orbit is made. Furthermore, the orbital path of each of satellites 110A-C may vary.

In some embodiments, one or more satellites may be associated with a same or different space-based communications networks. For example, system 100 may depict a first space-based communications network 112A and a second space-based communications network 112B. In some embodiments, each space-based communications network may include its own set of space-based communication protocols including frequency ranges that satellites may operate in, demodulation schemes, waveforms, etc. For example, a space-based communications network may include satellites that output data signals, where the data signals include RF signals of one or more frequency ranges (e.g., the 12-18 GHz band of the electromagnetic frequency spectrum). The RF signals may need to be converted from analog to digital by a communications device in order to be employed by a client device operating in the digital spectrum. Space-based communications network 112A may include satellites 110A and 110B whose operations may comply with a first set of space-based communication protocols. Space-based communications network 112B may include satellite 110C whose operations may comply with a second set of space-based communication protocols. In some embodiments, the first set of space-based communication protocols may differ from the second set of space-based communication protocols. For example, space-based communications network 112A may operate in a first frequency band while space-based communications network 112B may operate in a second frequency band.

System 100 may also include a satellite ground station 120. Satellite ground station 120 may include one or more satellite dishes or receivers configured to detect data signals incoming from satellites in LEO (e.g., satellites 110A-110C). Depending on the line of sight of a satellite and of the satellite ground station, different satellites may be capable of sending/receiving data signals to/from the satellite ground station. Some satellites may have orbital trajectories that never coincide with a particular ground station's line of sight. Therefore, entities operating/owning satellites, such as corporations, governments, and research facilities, may construct satellite ground stations at strategic locations so that their satellites will be accessible.

In some embodiments, satellite ground station 120 may include one or more instances of a computer system 102 and one or more instances of a communications device 122. While communications device 122 is shown as being a separate from computer system 102, some embodiments may include computer system 102 including communications device 122 and/or the functionalities of communications device 122. However, for illustrative purposes, communications device 122 and computer system 102 are depicted as separate components. In some embodiments, communications device 122 may be configured to obtain a data signal received by a satellite dish at satellite ground station 120, and may process that data signal so as to extract meaningful information therefrom. In some embodiments, communications device 122 may be configured to convert/translate a data signal received from a satellite (e.g., one of satellites 110A-110C) into a data signal communicable with one or more terrestrial-based communications networks 130. For example, a data signal from satellite 110A may include data encoded using a first set of space-based communication protocols associated with space-based communications network 112A. Communications device 122 may obtain configuration information that configures communications device 122 to extract relevant data from the data signal and translate the relevant data into a data signal including data encoded using one or more terrestrial-based communication protocols. Communications device 122 may further provide the converted data signal to terrestrial-based communications networks 130, which in turn may provide the data signal to one of client devices 140A-140M.

To configure communications device 122, computer system 102 may retrieve configuration information from a configuration database, where the configuration information includes rules and instructions for how to demodulate data signals received from satellites 110A-110C. In some embodiments, the configuration information may be retrieved by computer system 102 in response to a request, such as a request indicating that a particular satellite is within a line of site of a satellite dish of ground station 120. For instance, computer system 102 may monitor a time and may determine whether any satellites are within communication range of satellite ground station 120 at a given time. Furthermore, computer system 102 may determine whether a satellite is to be within communication range of satellite ground station 120 within a predetermined amount of time (e.g., within the next 15, 30, 60 minutes). As described below, computer system 102 may have access to a satellite location database that tracks predicted locations of a number of satellites throughout the course of a day. Upon retrieval of the configuration information, computer system 102 may provide the configuration information to communications device 122 and may cause communications device 122 to be configured for receiving data signals from one or more satellites.

In some embodiments, computer system 102 may determine whether any additional satellites are also going to be within communication range of satellite ground station 120 during a particular time period. If so, computer system 102 may determine whether those additional satellites are part of a same space-based communications network as the satellite with which the configuration information was retrieved for. For an additional satellite that is part of the same space-based communications network as the satellite (e.g., satellites 110A and 110B), computer system 102 may not need to retrieve any additional configuration information, as the space-based communication protocols for both satellites should be substantially similar. For an additional satellite that is not part of the same space-based communication network (e.g., satellite 110C), additional configuration information for configuring communications device 122 to receive data signals in accordance with the different space-based communication protocols of the different space-based communications network may be retrieved. The additional configuration information may be provided to communications device 122 to configure communications device 122 for the additional satellite's date signals.

In some embodiments, if multiple satellites—either from a same space-based communications network and/or a different space-based communications network—are within communication range of satellite ground station for a given time period, computer system 102 may generate an instruction to aggregate the received data signals. For example, if satellite 110A transmits data signal S1 including data encoded using a first set of space-based communication protocols, and satellite 110B transmits data signal S2 including data encoded using the first set of space-based communication protocols, computer system 102 may instruct communications device 122 to aggregate data signals S1 and S2. The aggregation may occur prior to extracting information from data signals S1 and S2 or after extracting information. The resulting signal S12 may then be converted into a data signal DS including data encoded using a set of terrestrial-based communication protocols. Thus, the throughput of data signal DS may be greater than the throughput if only a single satellite's data stream was employed. In some embodiments, the aggregation of the data signals may correspond to broadband bonding, where input signals are bonded together to increase the overall throughput, where the overall throughput is an aggregate of the input signals with some signal loss.

In some embodiments, computer system 102 may include one or more processors 104 or processor(s) 104, memory 106, and communications component 108. Processor(s) 104 may include any suitable processing circuitry capable of controlling operations and functionality of and within client device(s) 102. Processor(s) 104 may include a single processor or a plurality of processors (e.g., distributed processors). Processor(s) 104 may be any suitable processor capable of executing or otherwise performing instructions. Processor(s) 104 may include a central processing unit (CPU) that carries out program instructions to perform the arithmetic, logical, and input/output operations of computer system 102. Processor(s) 104 may execute code (e.g., processor firmware, a protocol stack, a database management system, an operating system, or a combination thereof) that creates an execution environment for one or more computer program instructions. Processor(s) 104 may include a programmable processor. Processor(s) 104 may include general or special purpose microprocessors. A processor may receive instructions and data from a memory (e.g., memory 106), a database, or both memory and a database. Processor(s) 104 may be a uni-processor system including one processor (e.g., processor), or a multi-processor system including any number of suitable processors. Multiple processors 104 may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., a field programmable gate array (FPGA) or an application specific integrated circuit (ASIC). Furthermore, computer system 102 may include a plurality of computing devices (e.g., distributed computer systems) or multiple instance of computer system 102 may be included in system 100 to implement various processing functions.

Memory 106 may include one or more types of storage mediums such as any volatile or non-volatile memory, or any removable or non-removable memory implemented in any suitable manner to store data for computer system 102. For example, information may be stored using computer-readable instructions, data structures, and/or program systems. Various types of storage/memory may include, but are not limited to, hard drives, solid state drives, flash memory, permanent memory (e.g., ROM), electronically erasable programmable read-only memory (EEPROM), CD-ROM, digital versatile disk (DVD) or other optical storage medium, magnetic cassettes, magnetic tape, magnetic disk storage or other magnetic storage devices, RAID storage systems, or any other storage type, or any combination thereof. Furthermore, memory 106 may be implemented as computer-readable storage media (CRSM), which may be any available physical media accessible by processor(s) 104 to execute one or more computer program instructions stored within memory 106.

Communications component 108 may include any circuitry, hardware, and/or software allowing or enabling one or more components of computer system 102 to communicate with another computer system 102, client device (e.g., client devices 140A-140M), or any other device and/or system. In some embodiments, communications component 108 may facilitate communications to and from computer system 102 to communications device 122, from communications device 122 to terrestrial-based communications networks 130, and/or from communications device 122 to one or more of client devices 140A-140M). In some embodiments, communications component 108 may employ one or more terrestrial-based communication protocols, one or more space-based communication protocols, or both space-based and terrestrial based communication protocols. For example, Transfer Control Protocol and Internet Protocol (TCP/IP) (e.g., any of the protocols used in each of the TCP/IP layers), Hypertext Transfer Protocol (HTTP), WebRTC, SIP, and/or wireless application protocol (WAP) may be used. Various additional terrestrial-based communication protocols may be include Wi-Fi (e.g., 802.11 protocol), Bluetooth, radio frequency systems (e.g., 900 MHz, 1.4 GHz, and 5.6 GHz communication systems), cellular networks (e.g., GSM, AMPS, GPRS, CDMA, EV-DO, EDGE, 3GSM, DECT, IS 136/TDMA, iDen, LTE or any other suitable cellular network protocol), infrared, BitTorrent, FTP, RTP, RTSP, SSH, and/or VOIP. It should be noted that while one or more operations are described herein as being performed by particular components of computer system 102, those operations may, in some embodiments, be performed by other components of computer system 102 or other components of system 100.

System 100 may further include terrestrial-based communications networks 130. Terrestrial-based communications networks 130 may include one or more Internet Service Providers (ISPs), such as Internet Service Provider (ISP) 132A and Internet Service Provider (ISP) 132N. Each ISP of terrestrial-based communications networks 130 may be operable to provide Internet services, telephonic services, and the like, to one or more client devices, such as client devices 140A-140M. In some embodiments, terrestrial-based communications networks 130 may facilitate communications via one or more terrestrial-based communication protocols, such as those mentioned above (e.g., TCP/IP, HTTP, WebRTC, SIP, WAP, Wi-Fi (e.g., 802.11 protocol), Bluetooth, radio frequency systems (e.g., 900 MHz, 1.4 GHz, and 5.6 GHz communication systems), cellular networks (e.g., GSM, AMPS, GPRS, CDMA, EV-DO, EDGE, 3GSM, DECT, IS 136/TDMA, iDen, LTE or any other suitable cellular network protocol), infrared, BitTorrent, FTP, RTP, RTSP, SSH, and/or VOIP.

Client devices 140A-140M may be capable of sending and receiving data signals other client devices via terrestrial-based communications networks 130 as well as, or alternatively, space-based communications networks 112A and/or 112B. Client devices 140A-140M may individually or collectively be referred to as client devices 140. Similar to computer system 102, each client device 140 may include one or more processors, memory, communications circuitry, and/or additional components (e.g., display interfaces, input devices, etc.). Each client device 140 may include any type of mobile terminal, fixed terminal, or other device. By way of example, client device 140 may include a desktop computer, a notebook computer, a tablet computer, a smartphone, a wearable device, or other client device. Users may, for instance, utilize one or more client devices 140 to interact with one another, one or more servers, or other components of system 100.

Figure 2:
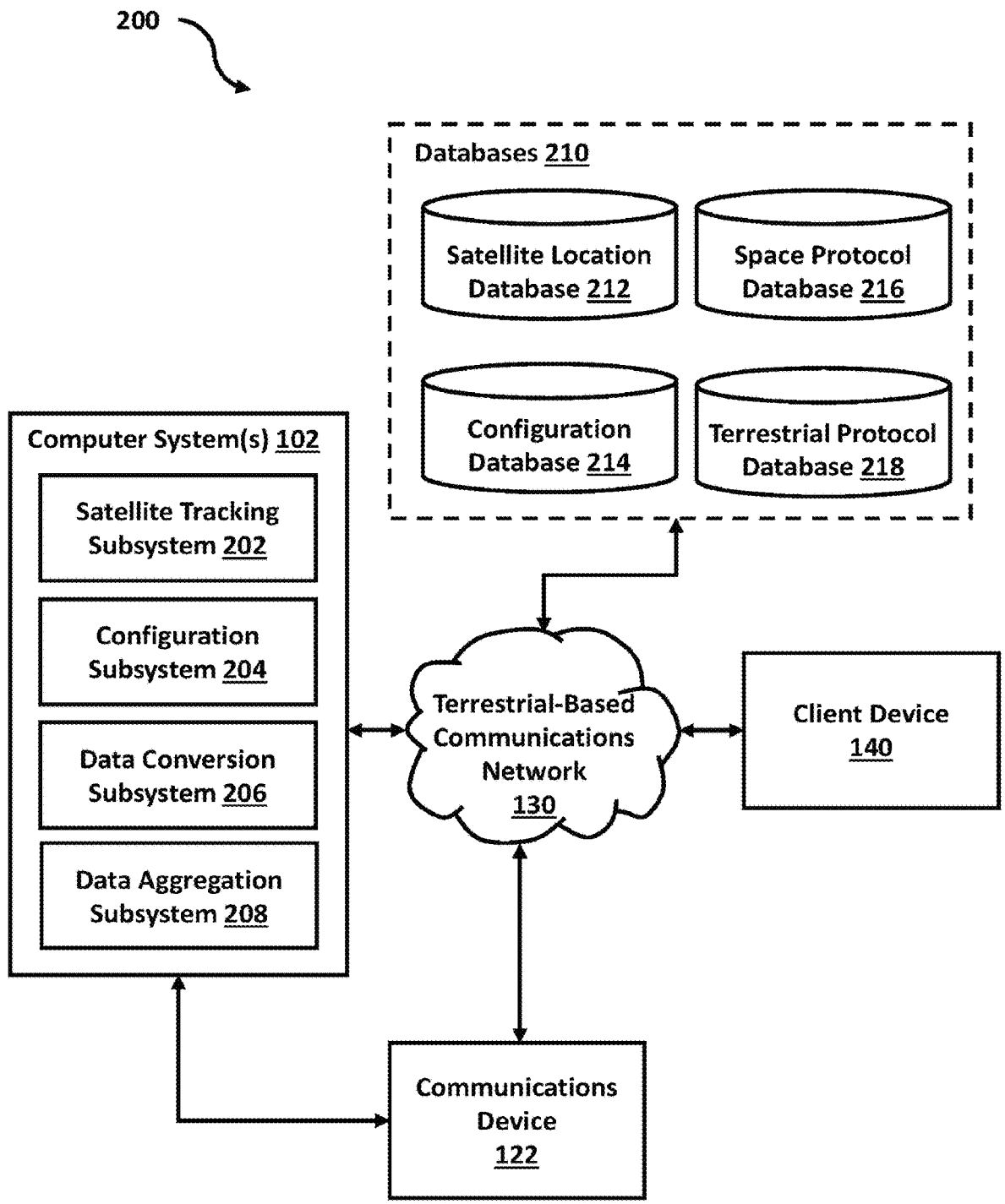
FIG. 2 is an illustrative schematic of an exemplary system for configuring a communications device for converting data signals from satellites into data signals for terrestrial-based communications networks, in accordance with various embodiments.

FIG. 2 is an illustrative schematic of an exemplary system 200 for configuring a communications device for converting data signals from satellites into data signals for terrestrial-based communications networks, in accordance with various embodiments. System 200, in some embodiments, may include computer system 102, communications device 122, client device 140, and terrestrial-based communications networks 130, as described above with respect to FIG. 1, as well as databases 210. Databases 210 may include a satellite location database 212, a configuration database 214, a space protocol database 216, a terrestrial protocol database 218, and/or other components. Computer system 102 may include a satellite tracking subsystem 202, a configuration subsystem 204, a data conversion subsystem 206, a data aggregation subsystem 208, and/or other components.

In some embodiments, communications device 122 may be configured via a remote connection to a network operations center. For example, individuals at the network operations center may create a schedule for a given period of time. In some embodiments, the period of time with which the schedule is formed for communications device 122 may be a few days (e.g., 1-7 days), however schedules may be created for any duration (e.g., a few hours, a few days, a few weeks, etc.). For each scheduled day that communications device 122 will operate, a network operator may configure communications device 122 at satellite ground station 120 with parameters needed to modulate and/or demodulate received data signals. The parameters may be determined based on the schedule and the satellites (e.g., space-based communication protocols associated with the satellites) expected to be in communication range of satellite ground station 120 during the given day (e.g. 24 hour time period). In some embodiments, computer system 102 or another computing device located at or communicatively connected to satellite ground station 120 may configure communications device 122 using a software script (e.g., a JavaScript) that is pre-loaded with instructions for decoding data signals received from a given satellite expected to be in communication range of satellite ground station 120 during the given day.

Subsystems 202-208

Satellite tracking subsystem 202 may be configured to monitor a position of various satellites in low Earth orbit. Satellite tracking subsystem 202 may obtain satellite location information indicating an orbital path of the various satellites. In some embodiments, satellite tracking subsystem 202 may generate the satellite location information for a plurality of satellites and store the satellite location information in satellite location database 212. The satellite location information may include global positioning data (e.g., longitudes/latitudes) of each satellite at different times of the day, as well as which satellite ground stations each satellite is able to communicate with based on the satellite's orbital path. Furthermore, the satellite location information may include indications of different accounts that are authorized to access each satellite's telemetry data at different times. Additional details related to determining orbital paths of satellites, accounts that are authorized to access communications from satellites at different times, how to determine whether an account is authorized to access communications from a satellite, and/or satellite ground stations that are capable of receiving/transmitting communications to/from satellites at the different times is described in commonly-assigned U.S. patent application Ser. No. 16/290,734, entitled "System and Method for Authorizing Access in Satellite Communications," and filed on Mar. 1, 2019, the disclosure of which is incorporated herein by reference in its entirety.

In some embodiments, satellite tracking subsystem 202 may periodically retrieve satellite location information from satellite location database 212 in order to determine which satellites will be coming within communication range (e.g., within line of sight) of satellite ground station 120. For example, satellite tracking subsystem 202 may retrieve satellite location information every day, every hour, every 30 minutes, every 5 minutes, etc. The temporal interval with which the satellite location information is retrieved from satellite location database 212 may be dependent on the number of satellites that are capable of communicating with a given satellite ground station (e.g., satellite ground station 120), the number and/or capabilities of communications device 122 at satellite ground station 120, as well as other factors. In some embodiments, satellite tracking subsystem 202 may include or be in communication with a timing mechanism (e.g., a clock) that indicates when a given temporal interval has elapsed. After the temporal interval has elapsed, satellite tracking subsystem 202 may generate a request for satellite location information and send the request to satellite location database 212. In some embodiments, the request may be transmitted over terrestrial-based communications networks 130. For instance databases 210 may be connected to computer system 102 via an Internet connection. In some embodiments, satellite location database 212 (and/or other databases of databases 210) may be connected to computer system 102 via one or more local networks and/or stored in internal memory of computer system 102. The process of generating and sending the request for satellite location information may repeat continuously or at a given amount of time. For example, if the temporal interval is set as being every 5 minutes, then at the end of every 5 minute time interval, satellite tracking subsystem 202 may generate and send the request for satellite location information to satellite location database 212.

In some embodiments, satellite tracking subsystem 202 may be configured to determine, based on the retrieved satellite location information, when a particular satellite (e.g., one or more of satellites 110A-110C) will be within communication range of satellite ground station 120. A satellite within communication range of a satellite ground station may be capable of having data signals transmitted from the satellite to a satellite dish (and/or vice versa) at the satellite ground station. Depending on the time of day and the orbital position of the satellite, data signals may not be capable of reaching the satellite dish due to physical and/or electromagnetic interference. For example, a satellite traveling above New York may not be able to transmit data signals to a satellite ground station located in South Africa, whereas the satellite may be able to transmit data signals to a satellite ground station located in New York. Therefore, to be "in communication range," which may also be referred to herein interchangeably as "within communication range," of a satellite ground station generally implies that data signals transmitted from a satellite are capable of reaching a satellite dish located at the satellite ground station so long as no unexpected or unpredictable impediments are present (e.g., absent any objects blocking signals from reaching the satellite dish, electromagnetic interference, etc.).

After the satellite location information is retrieved, satellite tracking subsystem 202 may determine which satellites will be within communication range of satellite ground station 120 at various times. For example, the retrieved satellite location information may indicate that satellite 110A will be within communication range of satellite ground station 120 during a time period T1, satellite 110B will be within communication range of satellite ground station 120 during a time period T2, and satellite 110C will be within communication range of satellite ground station 120 during a time period T3. Satellite tracking subsystem 202 may determine, based on a current time (e.g., a local time of a region where satellite ground station 120 is located), whether any of satellites 110A-110C will be or currently are within communication range of satellite ground station 120. For example, satellite tracking subsystem 202 may determine that, based on the current time, satellite 110A will be within communication range in X minutes, and therefore communications device 122 may be configured for receiving data signals from satellite 110A.

In some embodiments, satellite tracking subsystem 202 may generate a request indicating that a satellite will be within communication range of satellite ground station 120. Satellite tracking subsystem 202 may monitor a current time at satellite ground station 120, and upon determining that the current time is a predetermined amount of time prior to a beginning of a time period when a satellite will be in communication range of satellite ground station 120, may generate a request for configuring communications device 122. In some embodiments, the generated request may be provided to configuration subsystem 204, communications device 122, or both.

In some embodiments, satellite tracking subsystem 202 may determine that two or more satellites will be within communication range of satellite ground station 120 during some or all of a same time period. The satellites may be associated with a same space-based communications network or different space-based communications networks. For example, satellite tracking subsystem 202 may determine that at a first time, satellites 110A and 110B are going to be within communication range of satellite ground station 120. Satellite tracking subsystem 202 may generate a request indicating that satellites 110A and 110B, satellites 110A and 110C, satellites 110B and 110C, satellites 110A-110C, or one or more of satellites 110A-110C and one or more additional satellites, will be within communication range of satellite ground station 120 at the first time, and may send the instruction to configuration subsystem 204 to configure communications device 122.

Configuration subsystem 204 may be configured to retrieve configuration information from configuration database 214 and provide the configuration information to communications device 122. In some embodiments, configuration subsystem 204 may cause communications device 122 to be configured so that incoming data signals including data encoded using one or more space-based communication protocols may be processed and converted into data signals including data encoded using one or more terrestrial-based communication protocols. In response to receiving a request to configure communications device 122, for example the request being received from satellite tracking subsystem 202, configuration subsystem 204 may access configuration database 212 to retrieve configuration information associated with a satellite or satellites. In some embodiments, the request may indicate a satellite that will be within communication range of satellite ground station 120, as well as a start time and an end time of a time period during which the satellite is in communication range of satellite ground station 120. For example, the request may indicate that satellite 110A is to be within communication range of satellite ground station 120 during time period T1. Furthermore, the request may also indicate when communications device 122 is to be configured to receive data signals from satellite 110A and output data signals including data encoded using one or more terrestrial-based communication protocols. As another example, the request may indicate that satellites 110A and 110B, both associated with space-based communications network 112A, will be within communication range of satellite ground station 120 during a same time period. As still yet another example, the request may indicate that satellites 110A and/or 110B, associated with space-based communications network 112A, and satellite 110C, associated with space-based communications network 112B, will be within communication range of satellite ground station 120 during a same time period.

In some embodiments, configuration subsystem 204 may retrieve the configuration information from configuration database 214 based on an identifier associated with a satellite or satellites with which communications device 122 is to be configured for. The configuration information may be retrieved based on the request, which may indicate the satellite(s) to be within communication range of satellite ground station 120. For example, the request may indicate which satellite or satellites is/are going to be in communication range of satellite ground station 120 at a particular time. After receiving the request, configuration subsystem 204 may access configuration database 214 and query configuration database 214 for configuration information related to an identifier for the satellite(s). For example, the request may indicate that satellite 110A, having an identifier SAT_1 is going to be in communication range of satellite ground station 120 during time period T1, which is to begin in X minutes. Configuration subsystem 204 may query configuration database 214 using identifier SAT_1 and retrieve configuration information stored therein that is related to identifier SAT_1. If no configuration information is stored within configuration database 214 for a particular identifier, then a NULL response may be returned to configuration subsystem 204. As another example, the request may indicate that satellite 110A and satellite 110C, having identifiers SAT_1 and SAT_2, respectively, are going to be in communication range of satellite ground station 120 during time period T1 beginning in X minutes and time period T2 beginning in Y minutes. In this example, time periods T1 and T2 overlap at least partially. Configuration subsystem 204 may query configuration database 214 using identifiers SAT_1 and SAT_2 and retrieve configuration information stored therein that is related to identifier SAT_1 and SAT_2. Here, because satellite 110A is associated with space-based communications network 112A and satellite 110C is associated with space-based communications network 112B, first configuration information indicating space-based communication protocols associated with space-based communications network 112A and second configuration information associated with space-based communications network 112B may be retrieved from configuration database 214. However, if instead of satellite 110C, satellite 110B was determined to be within communication range of satellite ground station 120 during some or all of time period T1, then no additional configuration information may be needed as both satellites 110A and 110B are associated with space-based communications network 112A.

The configuration information retrieved by configuration subsystem 204 from configuration database 214 may indicate one or more space-based communication protocols associated with a particular satellite. For example, the space-based communication protocols may indicate different frequency bands with which a satellite operates, waveforms for data signals transmitted by the satellite, demodulation schemes for the data signals, and the like. Different satellites may be associated with different space-based communications networks, and each space-based communications network may operate using a different set of space-based communication protocols. Configuration database 214 may store each set of space-based communication protocols for each space-based communications network. Furthermore, configuration database 214 may store a list of satellites that are currently in orbit and operational (e.g., satellites having satellite location information stored within satellite location database 212). The list may further indicate, for each satellite, which space-based communications network it is associated with and/or the space-based communication protocols associated with it. In some embodiments, after receiving the request from satellite tracking subsystem 202, configuration subsystem 204 may identify the satellite with which configuration information is needed. The request for example may include satellite identifiers for the satellites that are going to be within communication range of satellite ground station 120. Based on the satellite identifiers, configuration subsystem 204 may query configuration database 214 to identify the corresponding configuration information associated with each satellite. For example, configuration database 214 may query the list of satellites, determine the space-based communications network associated with the satellite identified from the request, determine the space-based communication protocols associated with the space-based communications network, and retrieve configuration information for the space-based communication protocols.

In some embodiments, configuration subsystem 214 may be configured to access configuration database 214 to determine which space-based communication protocols may be needed for a particular satellite, and subsequently may access space protocol database 216 to retrieve the space-based communication protocols. For instance, space protocol database 216 may store a listing of each different space-based communications network and the space-based communication protocols associated therewith. Furthermore, in some embodiments, configuration subsystem 214 may be configured to access terrestrial protocol database 218 to retrieve terrestrial-based communication protocols. Space protocol database 216 may be updated with new space-based communication protocols as new satellites and new space-based communications networks are deployed. Furthermore, terrestrial protocol database 218 may be updated with new terrestrial-based communication protocols as they are develop and established for terrestrial communications networks (e.g., IPv6). Although satellite location database 212, configuration database 214, space protocol database 216, and terrestrial protocol database 218 are shown as being separate database, one or more of satellite location database 212, configuration database 214, space protocol database 216, and terrestrial protocol database 218 may be combined or distributed amongst different servers, data farms, and the like.

Data conversion subsystem 206 to cause communications device 122 to convert data signals including data encoded using space-based communication protocols to data signals including data encoded using terrestrial-based communication protocols. Depending on the particular satellite or satellites with which communications device 122 is configured for, different space-based communication protocols may be applicable. Data conversion subsystem 206 may receive the configuration information from configuration subsystem 204, and provide the configuration information to communications device 122. In some embodiments, computer system 102 and communications device 122 are part of a same device (e.g., communications device 122 includes computer system 102 or vice versa).

Data conversion subsystem 206 may use the configuration information to configure communications device 122. The configuration of communications device 122 may indicate which data signals are to be processed and converted into data signals for terrestrial-based communications. In some embodiments, data conversion subsystem 206 may, based on the configuration information, indicate to communications device 122 that a particular satellite associated with a space-based communications network operating using a set of space-based communication protocols is going to be within communications range of satellite ground station 120 at a particular time, and that communications device 122 is to be configured to receive data signals from the satellite. For example, data conversion subsystem 206 may indicate that a satellite operating in the 12-18 GHz frequency band will be in range of satellite ground station 120 in the next 5 minutes. Data conversion subsystem 206 may send instructions including and/or based on the configuration information to communications device 122 such that, in response to receiving data signals including data encoded based on the space-based communication protocols (e.g., in the 12-18 GHz frequency band), communications device 122 can extract the data from the data signals and output data signals including converted data encoded using terrestrial-based communication protocols associated with a terrestrial-based communications network (e.g., one of ISPs 132A-132N).

Data aggregation subsystem 208 may be configured to determine whether two or more satellites are within communications range of satellite ground station 120 during some or all of a same temporal period. If so, data aggregation subsystem 208 may generate an instruction to cause communications device 122 to aggregate data signals received from each satellite together, convert the aggregated data signals, and output a converted data signal. In some embodiments, data aggregation subsystem 208 may determine whether the satellites in communication range of satellite ground station 120 are part of a same space-based communications network. If so, the same configuration information may be used to configure communications device 122 so that communications device 122 may receive data signals including data encoded using space-based communication protocols from the satellites and output data signals including data encoded using terrestrial-based communication protocols. However, if two (or more) satellites associated with different space-based communication networks, data aggregation subsystem 208 may be configured to aggregate the data signals from each satellite into a common format, and based on the common format, convert the aggregated data signals into a data signal including data encoded using terrestrial-based communication protocols.

For instance, during a first time period, satellites 110A and 110B may both be within communication range of satellite ground station 120. Because satellites 110A and 110B are both associated with space-based communications network 112A, the same configuration information may be used to configure communications device 122. Therefore, when data signals from satellites 110A and 110B are received by communications device 122, the data signals may be aggregated together. The aggregated data signal may include data from both satellites 110A and 110B that is encoded using space-based communication protocols associated with space-based communications network 112A. Communications device 122 may then convert the aggregated data signal to a data signal including data encoded using terrestrial-based communication protocols, and may output the converted data signal to terrestrial based communications network(s) 130 and subsequently, client device 140.

In some embodiments, during a same time period, satellites 110A and 110C may be within communication range of satellite ground station 120. As satellite 110A may be associated with space-based communications network 112A and satellite 110C may be associated with space-based communications network 112B, different configuration information may be used to configure communications device 122. The different configuration information may be provided to communications device 122 so that communications device 122 may be capable of receiving and processing data signals from satellites 110A and 110C. In some embodiments, the data signals may be aggregated together upon being received. Alternatively, the data signals may be converted to a common format prior to being aggregated, as the data signals may be associated with different space-based communication protocols (e.g., different frequency bands). In either case, the aggregated data signal may then be converted by communications device 122 to a data signal including data encoded using terrestrial-based communication protocols, and may output the converted data signal to terrestrial based communications network(s) 130 and subsequently, client device 140. In some embodiments, data signals received from two satellites that communicate with different satellite ground stations during a same time period may be aggregated. For instance, a satellite from a space-based communications network different than space-based communications networks 112A and 112B may communicate with a satellite ground station (similar to satellite ground station 120) during a same time period with which satellite 110A is in communication range of satellite ground station 120. Despite being associated with different space-based communications networks, and thus different space-based communications protocols, as well as having their corresponding data signals received by different satellite ground stations, the data signals from the satellite from the different space-based communications network and satellite 110A may be aggregated. As an example, data signals from satellite 110A, received by satellite ground station 120, and data signals from the other satellite from the different space-based communications network, may each be provided to a respective instance of communications device 122 at their respective satellite ground station. After being decoded from each data signal's space-based communication protocol to the terrestrial-based communication protocols, a broadband bonding device may be used to aggregate the two data signals including data encoded with the terrestrial-based communication protocols. In some embodiments, computer system 102 may include broadband bonding functionality to enable aggregation of disparate satellites data signals.

In some embodiments, satellite ground station 120 may include multiple instances of computer system 102, communications device 122, or both. For example, satellite ground station may include computer system 102 communicatively coupled to a first instance of communications device 122 and a second instance of communications device 122. If two satellites associated with different space-based communication protocols are received during a same time period, each communications device may be configured to receive data signals from one of the two satellites. In some embodiments, after receiving the data signals, each instance of communications device 122 may convert the data signals including data encoded using a corresponding space-based communications protocol to data signals included data encoded using terrestrial-based communication protocols. After conversion, each instance of communications device 122 may provide the converted data signals to data aggregation subsystem 208, which may aggregate the converted data signals together and may output aggregated and converted data signals.

In some embodiments, aggregating two (or more) data signals together may result in some signal loss. For example, if two signals S1 and S2 are aggregated and converted to a common format (e.g., from space-based communication protocols to terrestrial-based communication protocols), the output data signal S may be less than or equal to the combination of S1 and S2 (e.g., S≤S1+S2). The difference between output data signal S and input data signals S1 and S2 may be the signal loss. In some embodiments, the signal loss may be a fraction of the total input signals S1 and S2. For example, the signal loss may be 5%, 10%, etc., less than the total of the input signals.

Example Flowcharts

Figure 3:
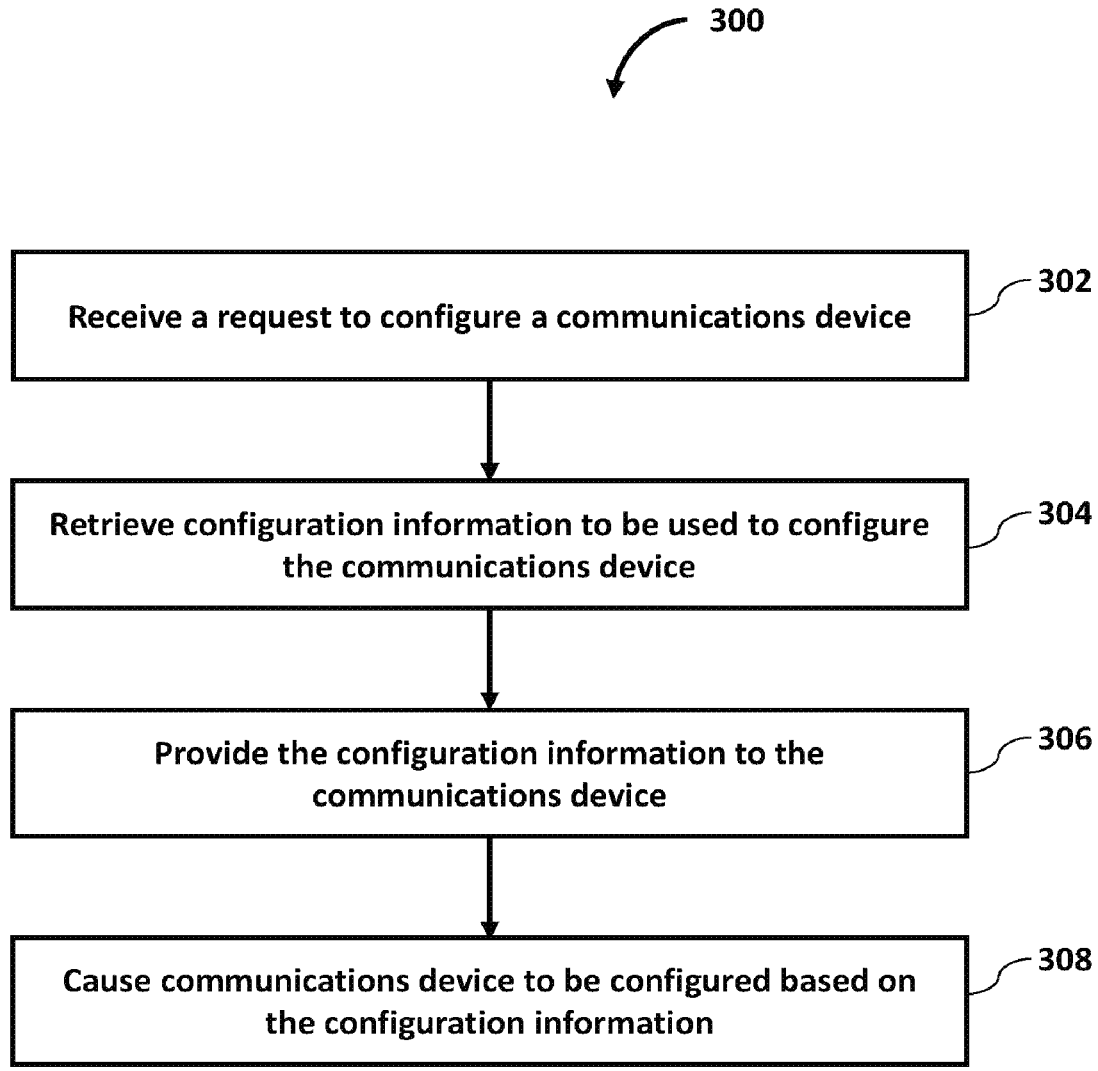
FIG. 3 is an illustrative flowchart of an exemplary process for configuring a communications device, in accordance with various embodiments.
Figure 4:
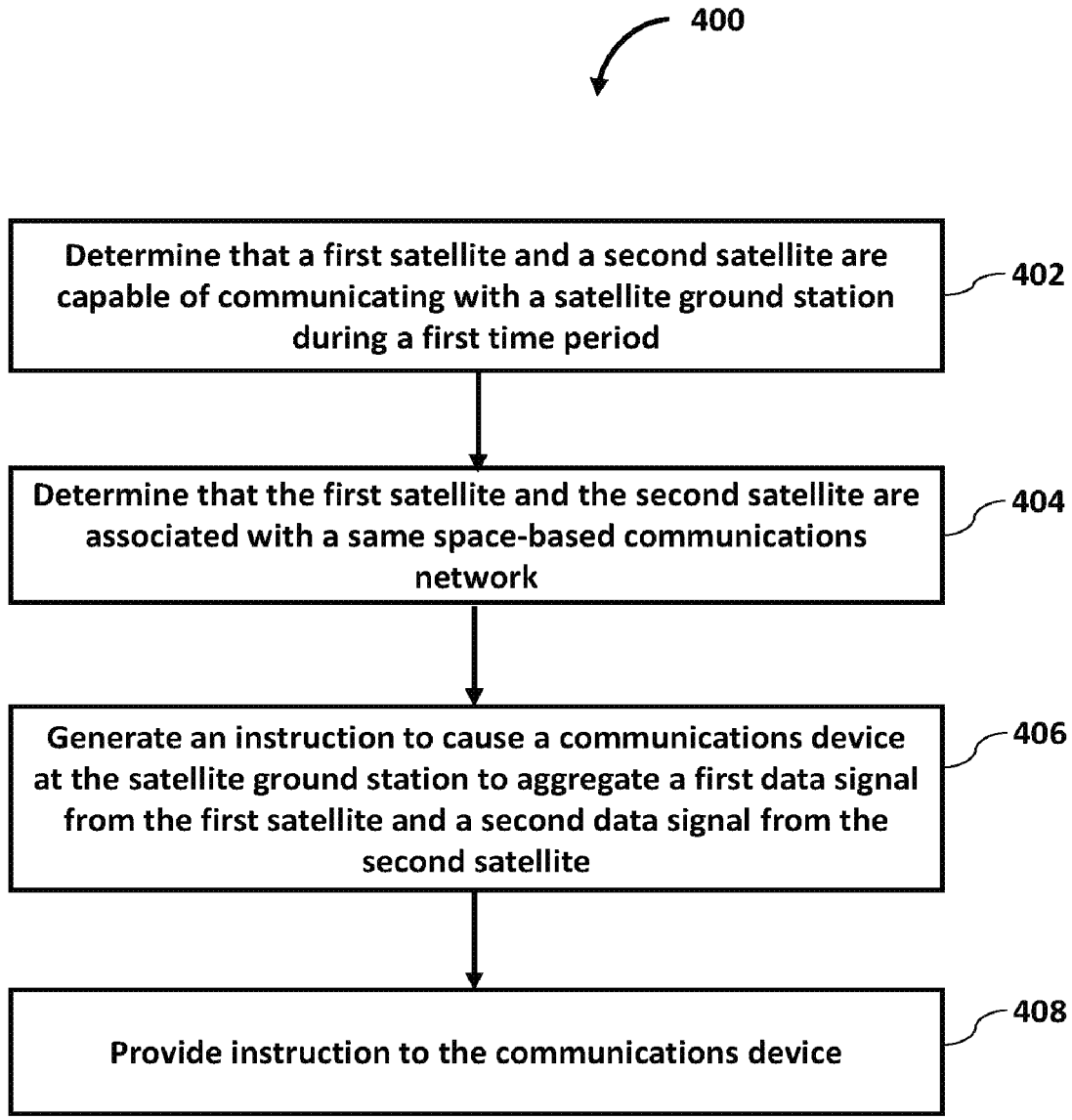
FIG. 4 is an illustrative flowchart of an exemplary process for aggregating data signals from satellites associated with a same space-based communications network, in accordance with various embodiments.
Figure 5:
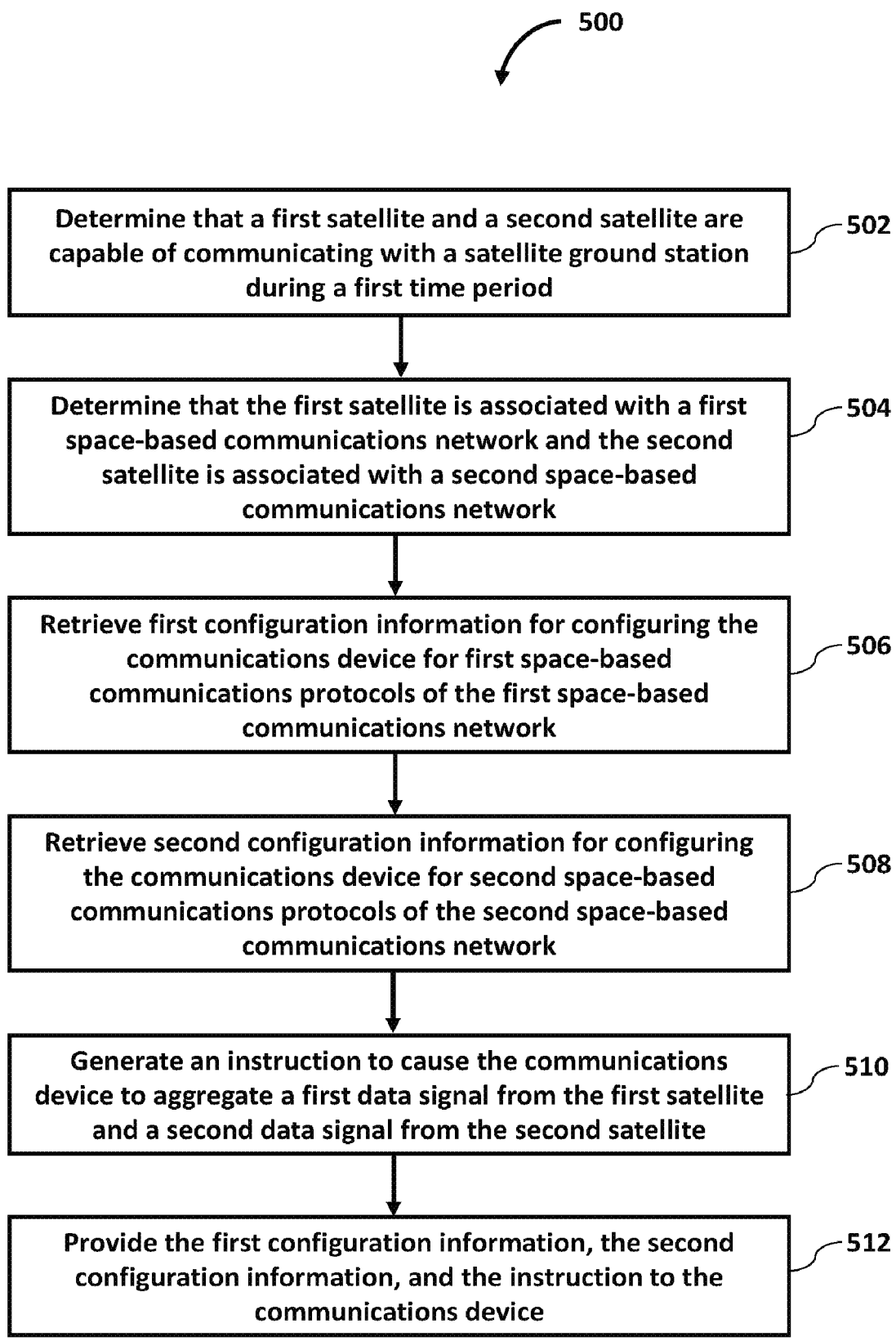
FIG. 5 is an illustrative flowchart of an exemplary process for aggregating data signals from satellites associated with different space-based communications networks, in accordance with various embodiments.

FIGS. 3-5 are example flowcharts of processing operations of methods that enable the various features and functionality of the system as described in detail above. The processing operations of each method presented below are intended to be illustrative and non-limiting. In some embodiments, for example, the methods may be accomplished with one or more additional operations not described, and/or without one or more of the operations discussed. Additionally, the order in which the processing operations of the methods are illustrated (and described below) is not intended to be limiting.

In some embodiments, the methods may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

FIG. 3 is an illustrative flowchart of an exemplary process 300 for configuring a communications device, in accordance with various embodiments. In an operation 302, a request to configure a communications device may be received. In some embodiments, a determination may be made that one or more satellites are, or will be, in communication range of satellite ground station 120. The determination may be based on satellite location information stored within satellite location database 212. For instance, a determination may be made that, for a current time at satellite ground station 120, satellite 110A is expected to be within communication range of satellite ground station 120 within the next X minutes. In response to determining that a satellite or satellites is/are, or will be, within communication range of satellite ground station 120, a request to configure a communications device or communications devices located at satellite ground station 120 may be generated. The request may indicate which satellites are coming into communication range of satellite ground station 120, an amount of time until the satellite(s) will be in communication range of satellite ground station 120, and a time period during which the satellite(s) will be in communication range of satellite ground station 120. For example, the request may indicate that satellite 110A, having an identifier SAT_1, will be within communication range of satellite ground station 120 in the next X minutes, and that satellite 110A will be within communication range of satellite ground station 120 for a time period T1. In some embodiments, if multiple satellites are expected to be within communication range of satellite ground station during a same time period, or within the same amount of time of a current time, then the request may include satellite identifiers for those satellites, amounts of time when those satellites will be in communication range of satellite ground station 120, and time periods with which those satellites will be in communication range of satellite ground station 120. In some embodiments, multiple requests-one for each satellite coming into communication range of satellite ground station 120—may be generated as opposed to a single request including identifiers and temporal information for multiple satellites. In some embodiments, operation 302 may be performed by a subsystem that is the same or similar to satellite tracking subsystem 202.

In an operation 304, configuration information to be used to configure the communications device may be retrieved. In some embodiments, the request may indicate the satellite or satellites expected to be within communication range of satellite ground station. Based on the request, configuration information for each satellite may be obtained from configuration database 214. The request may include identifiers of the satellites, and based on the identifiers, configuration database 214 may be queried to determine the space-based communications network that each satellite is associated with. For example, satellite 110A may be associated with space-based communications network 112A. Therefore, configuration information indicating space-based communication protocols for space-based communications network 112A may be needed to configure communications device 122 to receive data signals from satellite 110A. In some embodiments, after the space-based communication network is determined from configuration database 214, space protocol database 216 may be accessed to retrieve the space-based communication protocols for the space-based communications network. Similarly, terrestrial protocol database 218 may be accessed to retrieve terrestrial-based communication protocols for one or more terrestrial-based communications networks. In some embodiments, operation 304 may be performed by a subsystem that is the same or similar to configuration subsystem 204. In an operation 306, the configuration information may be provided to the communications device. For instance, the configuration information for configuring communications device 122 to receive data signals from satellite 110A may be provided to communications device 122. In some embodiments, different configuration information for configuring communications device 122 to receive data signals from multiple satellites may be provided to communications device 122. For example, if satellites 110A and 110C are both expected to be within communication range of satellite ground station 120, then configuration information including space-based communication protocols for space-based communications network 112A and space-based communication protocols for space-based communications network 112B may be retrieved and provided to communications device. In some embodiments, multiple instances of communications device 122 may be configured with similar or different configuration information. Continuing the previous example, a first instance of communications device 122 may be configured using configuration information associated with space-based communications network 112A while a second instance of communications device 122 may be configured using configuration information associated space-based communications network 112B. In some embodiments, operation 306 may be performed by a subsystem that is the same or similar to configuration subsystem 204, data conversion subsystem 206, or a combination thereof.

In an operation 308, communications device may be caused to be configured based on the configuration information. In response to the configuration information being provided to communications device 122, computer system 102 may cause communications device 122 to configure for receiving data signals from the incoming satellite. In some embodiments, causing the communications device to be configured may include setting the frequency band of the communications device to a range or ranges of the satellite's frequency bands, loading demodulation schemes into memory of the communications device, etc. In some embodiments, operation 308 may be performed by a subsystem that is the same or similar to configuration subsystem 204, data conversion subsystem 206, or a combination thereof.

FIG. 4 is an illustrative flowchart of an exemplary process 400 for aggregating data signals from satellites associated with a same space-based communications network, in accordance with various embodiments. In an operation 402, a determination may be made that a first satellite and a second satellite are capable of communicating with a satellite ground station during a first time period. For example, satellites 110A and 110B may both be within communication range of satellite ground station 120 during a same time period. In some embodiments, the determination that both satellites 110A and 110B are within communication range of satellite ground station 120 during the same time period may be based on satellite location information stored within satellite location database 212. For example, based on a precomputed orbital path of satellite 110A, a determination may be made that satellite 110A is going to be within communication range of satellite ground station 120 during a time period T1 beginning at time t1 and ending at time t2. Furthermore, based on a precomputed orbital path of satellite 110B, a determination may be made that satellite 110B is going to be within communication range of satellite ground station 120 during a time period T2, beginning at time t3 and ending at time t4. In some embodiments, a determination may be made that time periods T1 and T2 overlap. For example, time t3 is prior to time t2, but after time t1. As another example, times t1 and t2 may be substantially similar to times t3 and t4, respectively. Therefore, the orbital paths of satellites 110A and 110B may both be within communication range of satellite ground station 120 during a same time period. In some embodiments, operation 402 may be performed by a subsystem that is the same or similar to satellite tracking subsystem 202.

In an operation 404, a determination may be made that the first satellite and the second satellite are associated with a same space-based communications network. For example, satellite 110A and satellite 110B may both be associated with space-based communications network 112A. In some embodiments, an identifier for each satellite that is going to be within communications range of satellite ground station 120 may be included within a request to configure communications device 120. Based on the identifier, configuration database 214 may be queried to determine which space-based communications networks the corresponding satellites are associated with. For instance, the request may indicate that satellite 110A, having an identifier SAT_1, and satellite 110B, having identifier SAT_2, are both going to be within communication range of satellite ground station 120 during a first time period. By querying configuration database 214, a determination may be made that identifier SAT_1 and identifier SAT_2 are associated with space-based communications network 112A. In some embodiments, operation 404 may be performed by a subsystem that is the same or similar to configuration subsystem 204.

In an operation 406, an instruction may be generated to cause a communications device at the satellite ground station to aggregate a first data signal from the first satellite and a second data signal from the second satellite. In some embodiments, data signals received from satellites during a same time period may be aggregated together. By aggregating the data signals together, the total throughput provided to a terrestrial-based communications network (or networks) may be increased. In some embodiments, the instruction may indicate that the data signals to be aggregated are received from satellites associated with a same space-based communications device. As a result, the communications device may not require any additional configuration information for combining the data signals, as both may include data that is encoded using similar space-based communication protocols. In some embodiments, operation 406 may be performed by a subsystem that is the same or similar to data aggregation subsystem 208.

In an operation 408, the instruction may be provided to the communications device. In some embodiments, the instruction may be provided to the communications device prior to the configuration information being provided, subsequent to the configuration information be provided, or with the configuration information. In some embodiments, the instruction may be provided to the communications device prior to the communications device being configured based on the communications information, subsequent to the communications device being configured based on the communications information, or while the communications device is being configured. In some embodiments, if multiple communications devices are used to process data signals received from satellites, then the instruction may be provided to one or more of the communications devices. In some embodiments, operation 408 may be performed by a subsystem that is the same or similar to data aggregation subsystem 208.

FIG. 5 is an illustrative flowchart of an exemplary process 500 for aggregating data signals from satellites associated with different space-based communications networks, in accordance with various embodiments. In an operation 502, a determination may be made that a first satellite and a second satellite are capable of communicating with a satellite ground station during a first time period. For example, a determination may be made that satellite 110A and satellite 110C will both be within communication range of satellite ground station 120 during a first time period. In some embodiments, the determination that both satellites 110A and 110C are within communication range of satellite ground station 120 during the same time period may be based on satellite location information stored within satellite location database 212. For example, based on a precomputed orbital path of satellite 110A, a determination may be made that satellite 110A is going to be within communication range of satellite ground station 120 during a time period T1 beginning at time t1 and ending at time t2. Furthermore, based on a precomputed orbital path of satellite 110C, a determination may be made that satellite 110C is going to be within communication range of satellite ground station 120 during a time period T2, beginning at time t3 and ending at time t4. In some embodiments, a determination may be made that time periods T1 and T2 overlap. For example, time t3 is prior to time t2, but after time t1. As another example, times t1 and t2 may be substantially similar to times t3 and t4, respectively. Therefore, the orbital paths of satellites 110A and 110C may both be within communication range of satellite ground station 120 during a same time period. In some embodiments, operation 502 may be performed by a subsystem that is the same or similar to satellite tracking subsystem 202.

In an operation 504, a determination may be made that the first satellite is associated with a first space-based communications network and the second satellite is associated with a second space-based communications network. For example, satellite 110A may be associated with space-based communications network 112A, while satellite 110C may be associated with space-based communications network 112B. In some embodiments, an identifier for each satellite that is going to be within communications range of satellite ground station 120 may be included within a request to configure communications device 122. Based on the identifier, configuration database 214 may be queried to determine which space-based communications networks the corresponding satellites are associated with. For instance, the request may indicate that satellite 110A, having an identifier SAT_1, and satellite 110C, having identifier SAT_2, are both going to be within communication range of satellite ground station 120 during a first time period. By querying configuration database 214, a determination may be made that identifier SAT_1 is associated with space-based communications network 112A, while identifier SAT_2 is associated with space-based communications network 112B. In some embodiments, operation 504 may be performed by a subsystem that is the same or similar to configuration subsystem 204.

In an operation 506, first configuration information for configuring the communications device for first space-based communication protocols of the first space-based communications network may be retrieved. Furthermore, in an operation 508, second configuration information for configuring the communications device for second space-based communication protocols of the second space-based communications network may be retrieved. In some embodiments, the request may indicate the satellites expected to be within communication range of satellite ground station 120. Based on the request, configuration information for each satellite may be obtained from configuration database 214. The request may include identifiers of the satellites, and based on the identifiers, configuration database 214 may be queried to determine the space-based communications network that each satellite is associated with. For example, satellite 110A may be associated with space-based communications network 112A, and therefore configuration information indicating space-based communication protocols for space-based communications network 112A may be needed to configure communications device 122 to receive data signals from satellite 110A. Furthermore, satellite 110C may be associated with space-based communications network 112B, and therefore configuration information indicating space-based communication protocols for space-based communications network 112B may be needed to configure communications device 122 to receive data signals from satellite 110C. In some embodiments, based on the determined space-based communication networks, space protocol database 216 may be accessed to retrieve the space-based communication protocols for each space-based communications network. Similarly, terrestrial protocol database 218 may be accessed to retrieve terrestrial-based communication protocols for one or more terrestrial-based communications networks. In some embodiments, operations 506 and 508 may be performed by a subsystem that is the same or similar to configuration subsystem 204.

In an operation 510, an instruction to cause the communications device to aggregate a first data signal from the first satellite and a second data signal from the second satellite may be generated. In some embodiments, data signals received from satellites during a same time period may be aggregated together. In some embodiments, the instruction may indicate that the data signals to be aggregated are received from satellites associated with different space-based communication protocols. As a result, the communications device may require additional configuration information for combining the data signals, as both may include data that is encoded using different space-based communication protocols. Therefore, the instruction may indicate how the data signals may be aggregated together. For example, data signals may be converted to a common space-based communications in order to be aggregated. As another example, the data signals may be processed so as to extract information from the data signals and then converted to data signals including data encoded using terrestrial-based communication protocols, and the converted data signals may be aggregated together. In some embodiments, operation 510 may be performed by a subsystem that is the same or similar to data aggregation subsystem 208.

In an operation 512, the first configuration information, the second configuration information, and the instruction may be provided to the communications device. In some embodiments, the instruction may be provided to the communications device prior to the first configuration information and second configuration information being provided, subsequent to the first configuration information and second configuration information be provided, or with the first configuration information and second configuration information. In some embodiments, the instruction may be provided to the communications device prior to the communications device being configured based on the first configuration information and second configuration information, subsequent to the communications device being configured based on the first configuration information and second configuration information, or while the communications device is being configured. In some embodiments, if multiple communications devices are used to process data signals received from satellites, then the instruction may be provided to one or more of the communications devices. In some embodiments, operation 512 may be performed by a subsystem that is the same or similar to data aggregation subsystem 208.

Figure 6:
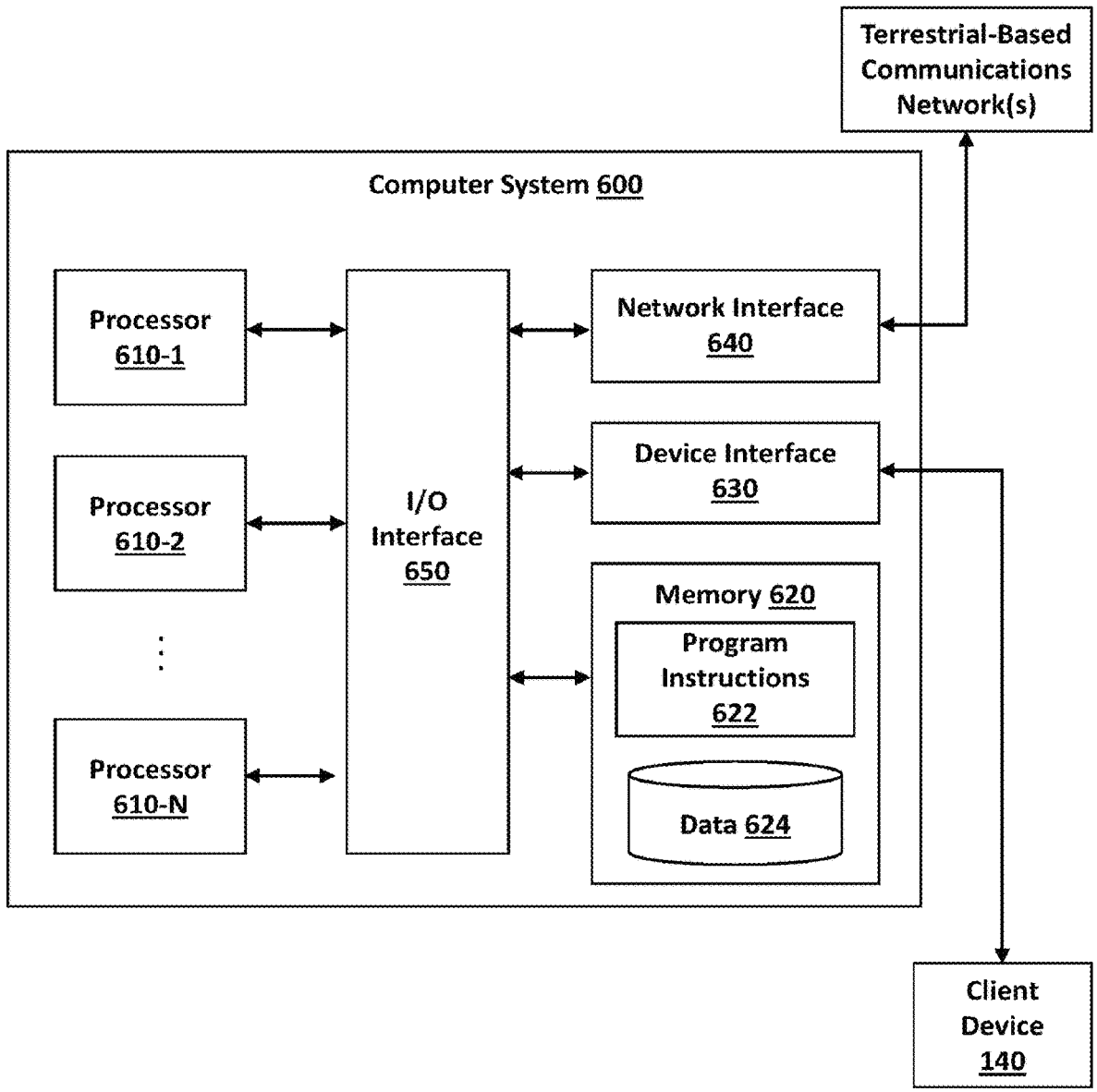
FIG. 6 is an illustrative diagram of an exemplary computing system upon which the present techniques may be implemented, in accordance with various embodiments.

FIG. 6 is an illustrative diagram of an exemplary computing device upon which the present techniques may be implemented, in accordance with various embodiments. In some cases, multiple instances of computer system 600 may communicate via a network to implement the present techniques in a distributed fashion. In some cases, instances may include a mobile computing device (like a smartphone with a camera) that captures images upon which the present techniques operate. In some cases, the instances may include server-side instances (e.g., in a micro-services architecture or monolithic architecture) that execute training and analysis with trained models. Various portions of systems and methods described herein, may include or be executed on one or more computer systems similar to computer system 600. Further, processes and modules described herein may be executed by one or more processing systems similar to that of computer system 600.

Computer system 600 may include one or more processors (e.g., processors 610-1-610-N) coupled to system memory 620, an input/output I/O device interface 630, and a network interface 640 via an input/output (I/O) interface 650. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/ output operations of computer system 600. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 620). Computer system 600 may be a uni-processor system including one processor (e.g., processor 610a), or a multi-processor system including any number of suitable processors (e.g., 610-1-610-N). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computer system 600 may include a plurality of computing devices (e.g., distributed computer systems) to implement various processing functions.

I/O device interface 630 may provide an interface for connection of one or more I/O devices, such as client device 140 or communications device 122 to computer system 600. I/O devices may include devices that receive input (e.g., from a user) or output information (e.g., to a user). I/O devices, e.g., client device 140, may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices may be connected to computer system 600 through a wired or wireless connection. I/O devices may be connected to computer system 600 from a remote location. I/O devices located on remote computer system, for example, may be connected to computer system 600 via a network and network interface 640.

Network interface 640 may include a network adapter that provides for connection of computer system 600 to a network. Network interface 640 may facilitate data exchange between computer system 600 and other devices connected to the network. Network interface 640 may support wired or wireless communication. The network may include an electronic communication network, such as the Internet, a local area network (LAN), a wide area network (WAN), a cellular communications network, or the like.

System memory 620 may be configured to store program instructions 622 or data 624. Program instructions 622 may be executable by a processor (e.g., one or more of processors 610-1-610-N) to implement one or more embodiments of the present techniques. Instructions 622 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 620 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 620 may include a non-transitory computer readable storage medium that may have program instructions stored thereon that are executable by a computer processor (e.g., one or more of processors 610-1-610-N) to cause the subject matter and the functional operations described herein. A memory (e.g., system memory 620) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 650 may be configured to coordinate I/O traffic between processors 610-1-610-N, system memory 620, network interface 640, I/O devices (e.g., client device 140), and/or other peripheral devices. I/O interface 650 may perform protocol, timing, or other data transformations to convert data signals from one component (e.g., system memory 620) into a format suitable for use by another component (e.g., processors 610-1-610-N). I/O interface 650 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 600 or multiple computer systems 600 configured to host different portions or instances of embodiments. Multiple computer systems 600 may provide for parallel or sequential processing/execution of one or more portions of the techniques described herein.

Those skilled in the art will appreciate that computer system 600 is merely illustrative and is not intended to limit the scope of the techniques described herein. Computer system 600 may include any combination of devices or software that may perform or otherwise provide for the performance of the techniques described herein. For example, computer system 600 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 600 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 600 may be transmitted to computer system 600 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y," "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the conversation management techniques as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The present techniques will be better understood with reference to the following enumerated embodiments:

1. A method for facilitating satellite and terrestrial internet communications, the method comprising: receiving a first request to configure a communications device associated with a satellite ground station, wherein the first request is received in response to a determination that, during a first time period, a first satellite associate with a first space-based communications network is capable of communicating with the satellite ground station, wherein the request is received prior to the first time period beginning; retrieving, from a configuration database, and in response to the first request, first configuration information to be used to configure the communications device such that the communications device is capable of: receiving a first data signal comprising first data encoded using one or more first space-based communication protocols associated with a first space-based communications network, and outputting, based on the first data signal, a second data signal comprising second data encoded using one or more terrestrial-based communication protocols associated with a terrestrial-based communications network; providing the first configuration information to the communications device; and causing the communications device to be configured based on the first configuration information such that, in response to the communications device receiving, as at least a portion of an input, the first data signal from the first satellite, the communications device outputs the second data signal to be provided to the terrestrial-based communications network.

2. The method of embodiment 1, wherein the first request indicates that a second satellite associated with the first space-based communications network is also capable of communicating with the satellite ground station during the first time period, the computer program instructions that, when executed by the one or more processors, further causing the computer system to: provide an instruction to the communications device to aggregate the first data signal and a third data signal, wherein: the third data signal comprises third data encoded using the one or more first space-based communication protocols associated with the first space-based communications network, the second data signal comprises an aggregation of the first data signal and the third data signal, and the second data comprises the first data and the third data converted from being encoded using the one or more first space-based communication protocols to the one or more terrestrial-based communication protocols.

3. The method of any of embodiments 1 and 2, wherein the computer program instructions, when executed by the one or more processors, further cause the computer system to: receive a second request to configure the communications device, wherein the second request is received in response to a determination that, during the first time period, a second satellite associate with a second space-based communications network is capable of communicating with the satellite ground station; retrieve, from the configuration database, and in response to the second request, second configuration information to be used to further configure the communications device such that the communications device is capable of: receiving a third data signal comprising third data encoded using one or more second space-based communication protocols associated with a second space-based communications network, and outputting the second data signal comprising an aggregation of the first data signal and the third data signal; provide the second configuration information to the communications device, wherein causing the communications device to be configured comprises: causing the communications device to be configured based on the first configuration information and the second configuration information such that, in response to the communications device receiving, as the input, the first data signal from the first satellite and the third data signal from the second satellite, the communications device is capable of: aggregating the first data signal and the third data signal to obtain a fourth data signal comprising fourth data encoded using the one or more first space-based communication protocols and the one or more second space-based communication protocols, and outputting the second data signal based on the fourth data converted from being encoded using the one or more first space-based communication protocols and the one or more second space-based communication protocols to being encoded using the one or more terrestrial-based communication protocols.

4. The method of any of embodiments 1-3, wherein the computer program instructions, when executed by the one or more processors, further cause the computer system to: receive a second request to configure the communications device, wherein the second request is received in response to a determination that, during a second time period, a second satellite associate with a second space-based communications network is capable of communicating with the satellite ground station; retrieving, from the configuration database, and in response to the second request, second configuration information to be used to configure the communications device; provide the second configuration information to the communications device such that, upon determining that the first time period has ended, the communications device is configured based on the second configuration information.

5. A tangible, non-transitory, computer-readable medium storing computing program instructions that, when executed by one or more processors, effectuate operations comprising operations of any of embodiments 1-4.

6. A system for facilitating satellite and terrestrial internet communications, the system comprising: memory comprising one or more computer program instructions; and one or more processors that, when the one or more computer program instructions are executed, are configured to perform operations of any of embodiments 1-4.

7. A method comprising: retrieving first configuration information for configuring a communications device; providing the first configuration information to the communications device; and causing the communications device to be configured based on the first configuration information wherein: responsive to receiving a first data signal from a first satellite, the communications device is configured to generate and output a second data signal based on the first data signal, the first data signal comprising first data encoded using one or more first space-based communication protocols, and the second data signal comprising second data encoded using one or more terrestrial-based communication protocols.

8. The method of embodiment 7, wherein the first configuration information comprises instructions to convert the first data signal to the second data signal and is determined based on the first satellite.

9. The method of any of embodiments 7 and 8, further comprising: receiving a request to configure the communications device, wherein: the request is received in response to a determination that the first satellite is capable of communicating with a satellite ground station during a first time period, the communications device is located at the satellite ground station, and the first configuration information is provided to the communications device prior to the first time period beginning.

10. The method of embodiment 9, wherein the request indicates that the first satellite and a second satellite are capable of communicating with the satellite ground station during the first time period, method further comprises: determining that the first satellite and the second satellite are associated with a first space-based communications network, wherein a third data signal received from the second satellite comprises third data encoded using the one or more first space-based communication protocols; providing an instruction to the communications device to cause the communications device to output the second data signal based on an aggregation of the first data signal and the third data signal.

12. The method of any of embodiments 7-11, further comprising: receiving a first request to configure the communications device based on a determination that the first satellite is capable of communicating with the communications device during a first time period, wherein the first configuration information is retrieved in response to the first request; receiving a second request to configure the communications device based on a determination that a second satellite is capable of communicating with the communications device during the first time period; retrieving second configuration information for configuring the second communications device based on the second request; and providing the second configuration information to the communications device, wherein causing the communications device to be configured comprises causing the communications device to be configured based on the first configuration information and the second configuration information.

13. The method of embodiment 12, further comprising: generating an instruction to cause the communications device to, responsive to a third data signal being received from the second satellite, aggregate the first data signal and the third data signal, wherein: the third data signal comprises third data encoded using one or more second space-based communication protocols, and the instruction indicates how the first data encoded using the one or more first space-based communication protocols and the third data encoded using the one or more second space-based communication protocols are to be aggregated; and providing the instruction to the communications device such that the second data signal comprising the second data is generated based on an aggregation of the first data signal and the third data signal.

14. The method of any of embodiments 7-12, further comprising: determining an end of a first time period during which the first satellite is capable of communicating with the communications device; receiving a request to further configure the communications device, wherein the request is received in response to a determination that a second satellite associate with a second space-based communications network is capable of communicating with the communications device during a second time period; retrieving, in response to the request, second configuration information to be used to configure the communications device for the second satellite; provide, prior to the second time period beginning, the second configuration information to the communications device such that the communications device is capable of: receiving a third data signal from the second satellite, and generating and outputting a fourth data signal based on the third data signal in accordance with the second configuration information.

15. The method of any of embodiments 7-14, wherein: the first data signal comprises a radio frequency (RF) signal; the RF signal is of one or more frequency ranges; the one or more terrestrial communication protocols comprise one or more internet communication protocols; and the first configuration information comprises instructions for: converting the RF signal from analog to digital and demodulating the RF signal based on the one or more first space-based communication protocols, extracting information from the RF signal after conversion from analog to digital and after being demodulated, and encoding the extracted information using the one or more internet communication protocols.

16. A system for facilitating satellite and terrestrial internet communications, the system comprising: memory comprising one or more computer program instructions; and one or more processors that, when the one or more computer program instructions are executed, are configured to perform operations of any of embodiments 7-15.

17. A tangible, non-transitory, computer-readable medium storing computing program instructions that, when executed by one or more processors, effectuate operations comprising operations of any of embodiments 7-15.

What is claimed is:

1. A computer system for facilitating satellite and terrestrial internet communications, the system comprising one or more processors configured to:
    obtain satellite location information indicating an orbital path of each of a plurality of satellites;
    determine, based on satellite location information, that a first satellite of the plurality of satellites is within communication range of a satellite ground station during a first time period;
    responsive to determining that the first satellite is within communication range of the satellite ground station during the first time period, receive a first request to configure a communications device associated with the satellite ground station, wherein the first request is received prior to the beginning of the first time period; and
    configure the communication device to transform a first data signal received by the communication device from the first satellite into a second data signal encoded using one or more terrestrial-based communication protocols associated with a terrestrial-based communications network.

2. The computer system of claim 1, wherein the first data signal comprises first data encoded using one or more space-based communication protocols associated with a space-based communications network that includes the first satellite.

3. The computer system of claim 1, wherein the one or more processors are further configured to:
    retrieve, from a configuration database, and in response to the first request, configuration information to be used to configure the communications device.

4. The computer system of claim 3, wherein the configuration information comprises information to be used to configure the communications device to receive the first data signal from the first satellite.

5. The computer system of claim 3, wherein the configuration information comprises information to be used to configure the communications device to transform the first data signal into the second data signal.

6. The computer system of claim 1, wherein the one or more processors are further configured to configure the communications device to output the second data signal to one or more client devices associated with the terrestrial-based communications network.

7. The computer system of claim 1, wherein the one or more processors are further configured to:
    determine, based on satellite location information, that a second satellite of the plurality of satellites is within communication range of a satellite ground station during a first time period;
    responsive to determining that the second satellite is within communication range of the satellite ground station during the first time period, receive a second request to configure the communications device associated with the satellite ground station; and
    configure the communications device to transform a third data signal received by the communications device from the second satellite into a fourth data signal encoded using the one or more terrestrial-based communication protocols associated with the terrestrial-based communications network.

8. The computer system of claim 7, wherein the one or more processors are further configured to:
    configure the communications device to aggregate the second data signal and the fourth data signal to obtain a fifth data signal.

9. The computer system of claim 8, wherein the one or more processors are further configured to:
    configure the communications device to output the fifth data signal to one or more client devices associated with the terrestrial-based communications network.

10. The computer system of claim 7, wherein the first satellite is associated with a first space-based communications network and the second satellite is associated with a second space-based communications network.

11. A method for facilitating satellite and terrestrial internet communications, the method comprising:
    obtaining satellite location information indicating an orbital path of each of a plurality of satellites;
    determining, based on satellite location information, that a first satellite of the plurality of satellites is within communication range of a satellite ground station during a first time period;
    responsive to determining that the first satellite is within communication range of the satellite ground station during the first time period, receiving a first request to configure a communications device associated with the satellite ground station, wherein the first request is received prior to the beginning of the first time period; and
    configuring the communication device to transform a first data signal received by the communication device from the first satellite into a second data signal encoded using one or more terrestrial-based communication protocols associated with a terrestrial-based communications network.

12. The method of claim 11, wherein the first data signal comprises first data encoded using one or more space-based communication protocols associated with a space-based communications network that includes the first satellite.

13. The method of claim 11, further comprising:
retrieving, from a configuration database, and in response to the first request, configuration information to be used to configure the communications device.

14. The method of claim 13, wherein the configuration information comprises information to be used to configure the communications device to receive the first data signal from the first satellite.

15. The method of claim 13, wherein the configuration information comprises information to be used to configure the communications device to transform the first data signal into the second data signal.

16. The method of claim 11, further comprising configuring the communications device to output the second data signal to one or more client devices associated with the terrestrial-based communications network.

17. The method of claim 11, further comprising:
determining, based on satellite location information, that a second satellite of the plurality of satellites is within communication range of a satellite ground station during a first time period;
responsive to determining that the second satellite is within communication range of the satellite ground station during the first time period, receiving a second request to configure the communications device associated with the satellite ground station; and
configuring the communications device to transform a third data signal received by the communications device from the second satellite into a fourth data signal encoded using the one or more terrestrial-based communication protocols associated with the terrestrial-based communications network.

18. The method of claim 17, further comprising:
configuring the communications device to aggregate the second data signal and the fourth data signal to obtain a fifth data signal.

19. The method of claim 18, further comprising:
configuring the communications device to output the fifth data signal to one or more client devices associated with the terrestrial-based communications network.

20. The method of claim 17, wherein the first satellite is associated with a first space-based communications network and the second satellite is associated with a second space-based communications network.

* * * * *